(12) United States Patent
Denisart et al.

(10) Patent No.: US 8,671,828 B2
(45) Date of Patent: Mar. 18, 2014

(54) SYSTEM AND METHOD FOR PREPARING A LIQUID BEVERAGE FROM A CARTRIDGE

(75) Inventors: Jean-Luc Denisart, Cully (CH); Alain Meier, Caneggio (CH); Enzo Bonacci, Savigny (CH); Hans Peter Pleisch, Corseaux (CH); Christian Talon, Vufflens-le-château (CH)

(73) Assignee: Nestec S.A., Vevey (CH)

( * ) Notice: Subject to any disclaimer, the term of this patent is extended or adjusted under 35 U.S.C. 154(b) by 720 days.

(21) Appl. No.: 12/529,801

(22) PCT Filed: Feb. 27, 2008

(86) PCT No.: PCT/EP2008/052339
§ 371 (c)(1),
(2), (4) Date: Sep. 3, 2009

(87) PCT Pub. No.: WO2008/107348
PCT Pub. Date: Sep. 12, 2008

(65) Prior Publication Data
US 2010/0083843 A1 Apr. 8, 2010

(30) Foreign Application Priority Data
Mar. 6, 2007 (EP) .................................. 07103613

(51) Int. Cl.
*A47J 31/06* (2006.01)
(52) U.S. Cl.
USPC ........................................................ 99/295
(58) Field of Classification Search
USPC ........................................................ 99/295
See application file for complete search history.

(56) References Cited

U.S. PATENT DOCUMENTS

| | | | | |
|---|---|---|---|---|
| 3,232,212 A | * | 2/1966 | Karlen et al. | 99/283 |
| 4,280,401 A | * | 7/1981 | Cleland | 99/295 |
| 4,843,955 A | * | 7/1989 | Henn et al. | 99/295 |
| 4,944,217 A | * | 7/1990 | Watanabe | 99/280 |
| 5,190,652 A | * | 3/1993 | van Thoor et al. | 210/474 |
| 6,606,938 B2 | * | 8/2003 | Taylor | 99/295 |
| 6,805,042 B2 | * | 10/2004 | Mordini et al. | 99/299 |
| 6,904,840 B1 | * | 6/2005 | Pfeifer et al. | 99/295 |
| 7,237,475 B2 | * | 7/2007 | Chen et al. | 99/302 R |
| 7,337,704 B2 | * | 3/2008 | Hammad et al. | 99/281 |

(Continued)

FOREIGN PATENT DOCUMENTS

WO WO 2006/082064 8/2006

OTHER PUBLICATIONS

International Search Report, PCT/EP2008/052339, mailed May 2, 2008.

*Primary Examiner* — William Pierce
(74) *Attorney, Agent, or Firm* — Winston & Strawn LLP

(57) ABSTRACT

A system and device for preparing a liquid beverage from a cartridge. The device includes a supply unit for supplying an injection fluid into the cartridge, a cartridge holder configured to accept and support the cartridge with the cartridge holder being detachable from the device. A complementary insertion mechanism of the device is configured to receive the cartridge holder in the device. The cartridge is positioned in the supply unit in an injection position with its injection surface substantially in an inclined plane relative to the horizontal plane and the injection mechanism is offset from the highest edge of the cartridge. The cartridge holder preferably comprises a linear wedge-shaped insertion member having a bearing surface inclined along an angle. The method of operation of the system and device are also disclosed.

21 Claims, 10 Drawing Sheets

(56) References Cited

U.S. PATENT DOCUMENTS

| | | | |
|---|---|---|---|
| 7,578,584 B2 * | 8/2009 | Hattori et al. | 347/85 |
| 7,832,328 B2 * | 11/2010 | Koeling et al. | 99/284 |
| 2007/0272084 A1 | 11/2007 | Mandralis et al. | 99/275 |
| 2011/0197771 A1 * | 8/2011 | Bolzicco et al. | 99/283 |

* cited by examiner

US 8,671,828 B2

SYSTEM AND METHOD FOR PREPARING A LIQUID BEVERAGE FROM A CARTRIDGE

This application is a 371 filing of International Patent Application PCT/EP2008/052339 filed Feb. 27, 2008.

BACKGROUND

The present invention relates to a system for preparing a liquid beverage from a cartridge. In particular, the invention relates to the preparation of hot or cold drinks from cartridges containing one or more food ingredients.

Numerous types of system for preparing drinks from cartridges exist. The way in which the cartridge is inserted into the machine preferably needs to be fairly direct, free of complications, and allow the cartridge to be removed easily after use.

Patent Application WO 2006/082064 describes a device with a removable cartridge holder comprising an injector. The injection may be positioned in an offset manner on the surface of the cartridge; this makes it possible to optimize the flow of fluid within the cartridge and therefore to encourage, for example, the dissolving or dispersion of certain ingredients. However, one problem encountered by this device is linked to a "geyser" or "whale" affect at the moment when the injector of the cartridge holder is disengaged relative to the supply unit. This effect is expressed by a jet of pressurized liquid which escapes outside of the cartridge and through the injector, especially when the cartridge has a large headspace volume. This jet mainly originates from the sudden pressure release of the gases contained in the cartridge and that are compressed in the latter during the pressurization by the water injected into the cartridge. When the initial volume of gas in the cartridge is large, the sudden pressure release of the gas in the cartridge produces a jet of boiling liquid ("geyser" effect) through the perforation of the cartridge. Furthermore, at the moment of disengagement with the injection unit, the "geyser" effect is also promoted by the very small diameter of the injector.

Another problem results from the mode of insertion and closure of the cartridge holder which is not intuitive and involves several combined movements, in particular a translational insertion movement followed by a downwards pressing movement on the cartridge holder to bring the supply unit and the cartridge holder together relative to one another. One advantage would be to make the closure mode both intuitive and simple to use while providing closure safety taking into account the high pressures used in the cartridge.

The object of the present invention is to provide a solution to these problems.

SUMMARY OF THE INVENTION

The present invention is based on a first general principle which consists in limiting or eliminating the resurgence of a liquid or gas-liquid mixture through at least one injection point in the cartridge due to the raised pressure created when a pressurized fluid is injected by planning to keep the injection surface of the cartridge inclined with respect to the horizontal plane while sufficiently raising the injection point of the cartridge and by maintaining this position up to the moment of disengagement of the injection means with respect to the cartridge.

More particularly, the invention relates to a system for preparing a liquid beverage from a cartridge comprising a device, the latter comprising: a supply unit for supplying injection fluid to the cartridge; a cartridge holder configured to accept and support a cartridge; injection means that are able to move relative to the cartridge holder in order to inject an injection fluid into the cartridge; and a cartridge comprising an injection surface; said cartridge being provided in order to be housed in the cartridge holder.

The cartridge holder is positioned in the supply unit in an injection position so that the injection surface of the cartridge is held substantially in a plane inclined at less than 45 degrees relative to the horizontal plane, and the injection means are configured at the moment of removal to form an injection point through the injection surface of the cartridge which is offset from the highest side of said injection surface of the cartridge after engagement of the injection means with the injection surface of the cartridge.

Thus, the invention aims to reduce the risk of pressurized resurgence of liquid or of gas and liquid, preferably by keeping a volume of gas in the cartridge at the location of the injection point and therefore, preferably, above the possible level of liquid remaining in the cartridge, until the moment of disengagement of the injection means in the cartridge. Thus, during the disengagement, a pressure release is produced through the injection point mainly in the form of gas, reducing the risk of spraying liquid outside of the cartridge until a sufficient and safe reduction of the gas pressure is established in the cartridge. It should be noted that the level of liquid in the cartridge could easily reach the injection point if the injection surface of the cartridge was horizontal. On the other hand, if the cartridge was too greatly inclined, it would no longer be possible to deliver the liquid directly into the cup.

The injection surface of the cartridge is substantially planar or may be slightly convex or concave.

Preferably, the device comprises an injection support connected by actuating means to engage and disengage the injection means from the injection surface of the cartridge by holding the cartridge in an inclined position. Thus, the cartridge does not immediately re-establish its horizontal position at the moment of disengagement of the injection means but its injection surface remains in an inclined position. Therefore, since the pressure-release time is relatively brief (around 1 to 3 seconds), the risk of spraying pressurized liquid is greatly minimized.

The disengagement of the injection means also allows degassing of the cartridge directly through the injection point.

The injection means are preferably configured in order to form an injection point through the surface inside the highest possible quadrant relative to the centre of said surface of the cartridge. The term "quadrant" should be understood to mean any region of the injection surface limited by two perpendicular straight lines whose common origin is the centre of the cartridge.

According to one aspect of the invention, the injection surface of the cartridge is inclined at an angle between 2 and 25 degrees, preferably 5 and 20 degrees, relative to the horizontal plane.

According to one possible aspect of the invention, the cartridge holder can be detached from the device and the device comprises complementary insertion means allowing the cartridge holder to be inserted from its detached position into its injection position in the supply unit.

The injection means are also configured to form an injection point of sufficient dimension to enable rapid (high flow) degassing at a relatively low speed. The injection means preferably comprise a single injection spike. The injection spike preferably forms an opening in the injection surface of the cartridge of at least 1 mm in diameter, preferably between around 1.5 mm and 2.5 mm. The objective is to produce a sufficient opening to reduce the speed at which the gas escapes and to increase the flow at the moment it escapes. Thus, the pressure-release time is reduced while reducing the power with which the gas escapes and therefore reducing the risk of liquid spraying outside of the cartridge.

Preferably, a duct for carrying the injection fluid into the cartridge passes through the injection spike. The orifice of the duct may be positioned along the axis of the duct or may be inclined slightly so as to direct the jet towards the bottom of the cartridge and offset from the centre. Such a device makes it easier to achieve sealing around the injection means, and more precisely around the duct. However, it is possible to envisage a duct for carrying the pressurized fluid and a spike which are positioned separately and a means ensuring the sealing which surrounds both the spike and the fluid inlet into the cartridge. When a duct passes through the spike, the spike has a short length so as to prevent liquid climbing back up through the spike. The useful length of the spike is thus preferably between around 2 and 10 mm, preferably between 4 and 7 mm.

According to yet another feature of the invention, the injection support comprises a raised engagement portion in order to drive said injection surface of the cartridge towards the inside of the cartridge and to thus reduce the internal volume of the cartridge. The volume gained by the engagement portion over that of the cartridge makes it possible to reduce the volume of gas in the cartridge which is then capable of being compressed during the increase in pressure in the cartridge and of thus conserving a compensation space which allows an at least partial pressure release of gas inside the cartridge during the removal of the movable injection support on reopening the device. The engagement portion of the movable support may, for example, be a convex surface portion. Preferably, the surface of the cartridge is a flexible membrane that can easily be deformed under the effect of the engagement of the engagement portion of the movable support.

A sealing means may be provided in association with the injection means in order to provide sealing at least locally and directly between said injection means and the injection surface of the cartridge.

The injection surface of the cartridge may be convex due to the raised pressure of gas in the latter when the cartridge is hermetically sealed before use. The gas pressure may result from degassing of the ingredients after sealing the cartridge (for example, from carbon dioxide) and also from the inert gas inserted in the cartridge during production. On the other hand, the injection surface may be concave due to a partial vacuum created in the cartridge at the time of filling and closing during production. The injection surface may also be convex or concave for any other reason. For example, the injection surface may be convex by deformation due to the mass of ingredients contained in the cartridge.

The complementary insertion means of the cartridge holder in the supply unit of the device comprise ribs associated with guide grooves. Apart from the ease of use and the simplicity, another advantage in relation to the invention is enabling removal of the cartridge holder with respect to the supply unit while keeping the cartridge in the inclined position so as to allow sufficient degassing without risk of a "geyser" effect.

The ribs and/or guide ribs are preferably rectilinear. They may be continuous or form discontinuous portions as long as a translational guidance along a favoured insertion direction is carried out.

According to a first possible embodiment, the insertion means of the supply unit are directed along an inclined plane relative to the horizontal plane so that the cartridge holder is guided in the direction of said inclined plane during its insertion and removal from the supply unit and thus serves to keep the injection surface of the cartridge in said angle of inclination. The complementary insertion means form ribs/grooves of which the thickness is, for example, substantially constant, that is to say of which the lower and upper guide ridges of each side of the cartridge holder are substantially parallel to one another.

According to a second possible embodiment, the complementary insertion means are wedge-shaped. This may have several advantages. A first advantage is being able to guide the insertion of the cartridge holder along a substantially horizontal plane while keeping the injection surface of the cartridge in the direction of said inclined plane. A second advantage is to be able to provide at least some of the forces for clamping the cartridge holder in the insertion position by the pressure of fluid in the cartridge. Therefore, the mechanical clamping forces to be applied to the cartridge holder, via the mechanical closure components of the device, may be weaker. Another advantage is enabling a gradual reduction of the distance between the injection means and the cartridge; this reduces the risk of tearing the cartridge and facilitates the insertion of the cartridge holder into the device.

For example, the wedge-shaped insertion means comprise guide grooves or ribs of the cartridge holder whose lower and upper ridges of each side converge thus forming a variable thickness. The insertion means of the supply unit then comprise guide grooves or ribs having a substantially complementary shape. Preferably, the lower and upper ridges converge in the insertion direction.

According to one embodiment, the injection means comprise a single injection spike supported by an injection support that is able to move into engagement relative to the cartridge.

According to one aspect of the invention, a local sealing means may be associated with said injection spike. The expression "local means" should be understood to mean a means positioned in the vicinity of the sealing spike in engagement with the surface of the cartridge around the spike so as to prevent liquid from escaping against the outer surface of the cartridge. The means may extend to a greater or lesser extent over the surface of the cartridge from the injection point. The local sealing means is preferably an elastic means that makes it possible to compensate for the variations in separation and/or any possible play associated with the pressure exerted by the fluid on the surface of the cartridge. The sealing means may be a ring or a wall made of an elastomer or silicone surrounding the base of said injection spike, for example. The ring or wall may have a diameter between 2 mm and up to the equivalent of the injection surface of the cartridge.

The sealing means may also extend over the movable support in order to fit against substantially the whole of the injection surface of the cartridge. It may be, in this case, a coating made of an elastomeric or silicone material which covers the surface of the injection support in contact with the injection surface of the cartridge.

According to one feature of the invention, clamping means are provided in order to clamp the cartridge holder into the supply unit. In order to do this, the clamping means comprise a clamping surface that clamps onto the cartridge and/or the cartridge holder separately to the sealing function itself on the injection surface of the cartridge. The clamping means also comprise actuating means which may be adjusted so as to adopt a stable clamping position clamping the movable support against at least one non-deformable bearing surface of the cartridge, preferably the edging of the cartridge pressing against the clamping edges of the cartridge holder. The actuating means comprise, for example, toggle lever, gear or cam means, that can be actuated manually.

The invention also relates to the device by itself independently of the cartridge. For this purpose, the device comprises: a cartridge holder comprising a housing to accept a cartridge; a supply unit for supplying injection fluid comprising a fixed base part and an injection support that is able to move relative to the base part and that can be actuated in engagement relative to the cartridge holder on which injection means are arranged for injecting an injection fluid into the cartridge after engagement of the support relative to the cartridge holder. The cartridge holder is positioned in the supply unit in an injection position in a plane inclined at less than 45 degrees relative to the horizontal plane. The movable support can be moved into engagement relative to the cartridge holder in order to place the injection means offset relative to the central axis of the movable support and from the substantially highest side in the housing of the cartridge holder while the cartridge holder is kept in an inclined position in the supply unit.

The invention also relates to a cartridge holder by itself.

The cartridge holder is thus intended to be inserted into a fluid supply unit for preparing a liquid from a cartridge containing at least one food substance. The cartridge holder comprises: a housing to accept a cartridge; a free end and means of insertion in the supply unit comprising at least one rib and/or guide groove portion. Said rib and/or guide groove portion preferably has a variable thickness thus forming a linear wedge-shaped insertion means.

Preferably, the rib or groove portion comprises a pair of lower ridges which converge in the direction of a pair of upper ridges and towards the free end of the cartridge holder.

Preferably, the insertion means is formed from two rib and/or groove portions positioned on both sides of the housing.

As has already been explained, such an insertion means has a mechanical clamping function with the supply unit under the combined effect of the geometry of said insertion means and of the pressurized fluid in the cartridge. Another function of this means is that it makes it possible to keep the cartridge holder in a configuration inclined in an insertion position in order to keep a volume of air at the level of the injection point; this reduces the risk of resurgence of pressurized liquid at the moment of disengagement of the injection means from the cartridge.

Preferably, the thickness of said ribs or grooves of the insertion means comprises a pair of lower ridges which converge, preferably, in the direction of a pair of upper ridges and towards the free end of the cartridge holder. The lower and upper ridges serve as a guide for the insertion of the cartridge holder into the supply unit and are thus preferably rectilinear.

Preferably, the upper and lower ridges make an angle of around 5 to 20 degrees.

The cartridge holder preferably also has a sleeve on the side opposite to the free end making it possible to facilitate the handling of the cartridge holder.

In one possible alternative, the injection means could make up part of the cartridge holder.

Other features of the device of the invention make up part of the present description.

The invention also relates to a method for reducing the resurgence of a liquid or gas-liquid mixture through at least one injection point in a cartridge as a result of the raised pressure created when a pressurized fluid is injected by means into the cartridge during the preparation of a liquid beverage; the method comprising: piercing an injection surface of the cartridge by moving an injection means relative to the cartridge, keeping the cartridge in a slightly inclined position with respect to the horizontal plane during the injection by placing the injection point of the cartridge higher up than the centre of said surface.

Preferably, according to the method of the invention, the injection means are disengaged relative to the cartridge by keeping the cartridge in the same inclined position. The injection surface of the cartridge is preferably kept inclined at an angle between 5 and 20 degrees with respect to the horizontal plane.

The cartridge may be formed from a body made of a rigid or semi-rigid material sealed by a flexible airtight membrane. It may also be a sachet made of an air-permeable material such as made of filter paper or else a combination of a flexible cartridge and a flexible sachet.

BRIEF DESCRIPTION OF THE FIGURES

Other features and advantages of the present invention will appear on reading the description which follows, given by way of non-limiting example and with reference to the appended drawings in which.

DETAILED DESCRIPTION OF THE INVENTION

Figure 1:
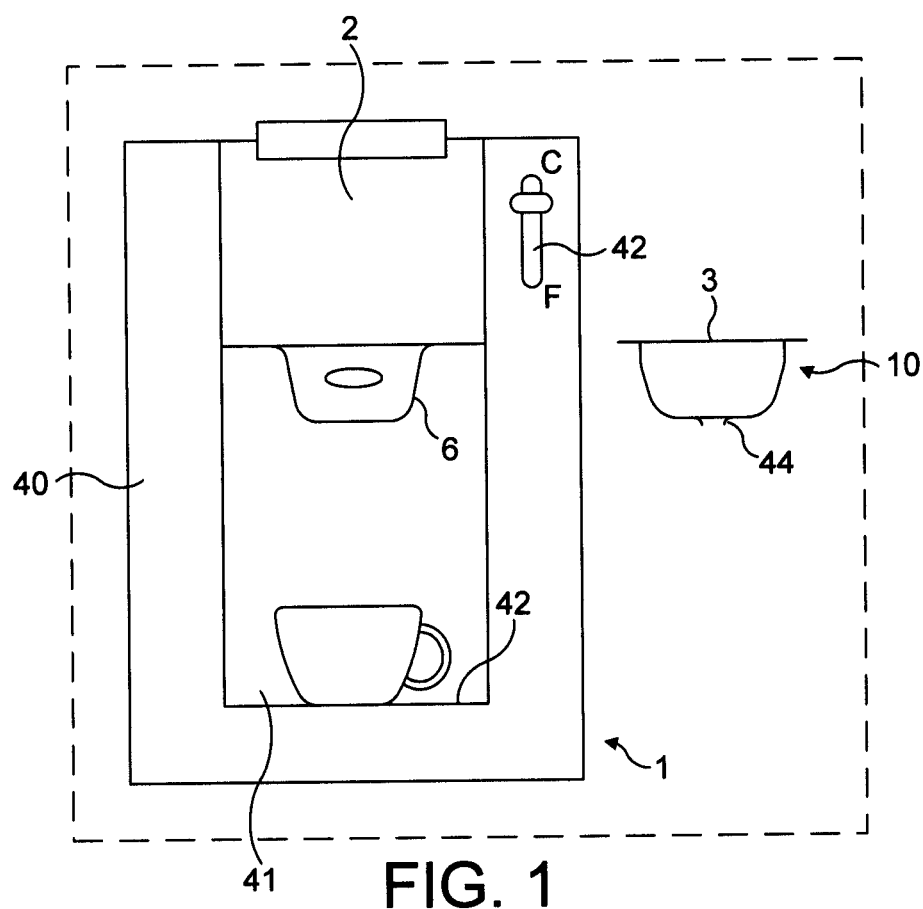
FIG. 1 is a simplified general view of a liquid preparation system according to the invention.
Figure 2:
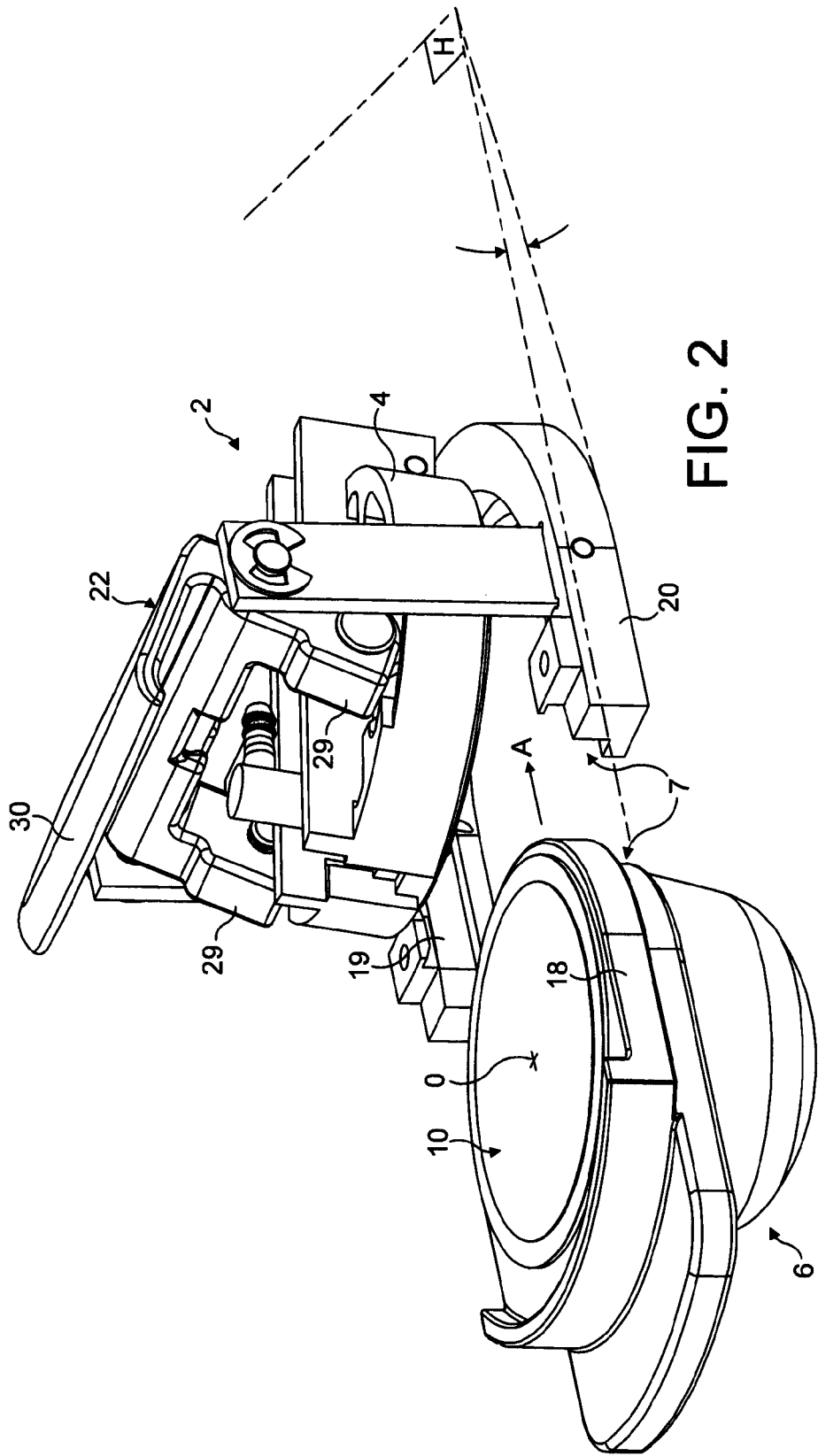
FIG. 2 shows a perspective view of the device according to a first embodiment, in particular of the supply unit in the open position and of the cartridge holder in the detached position.
Figure 3:
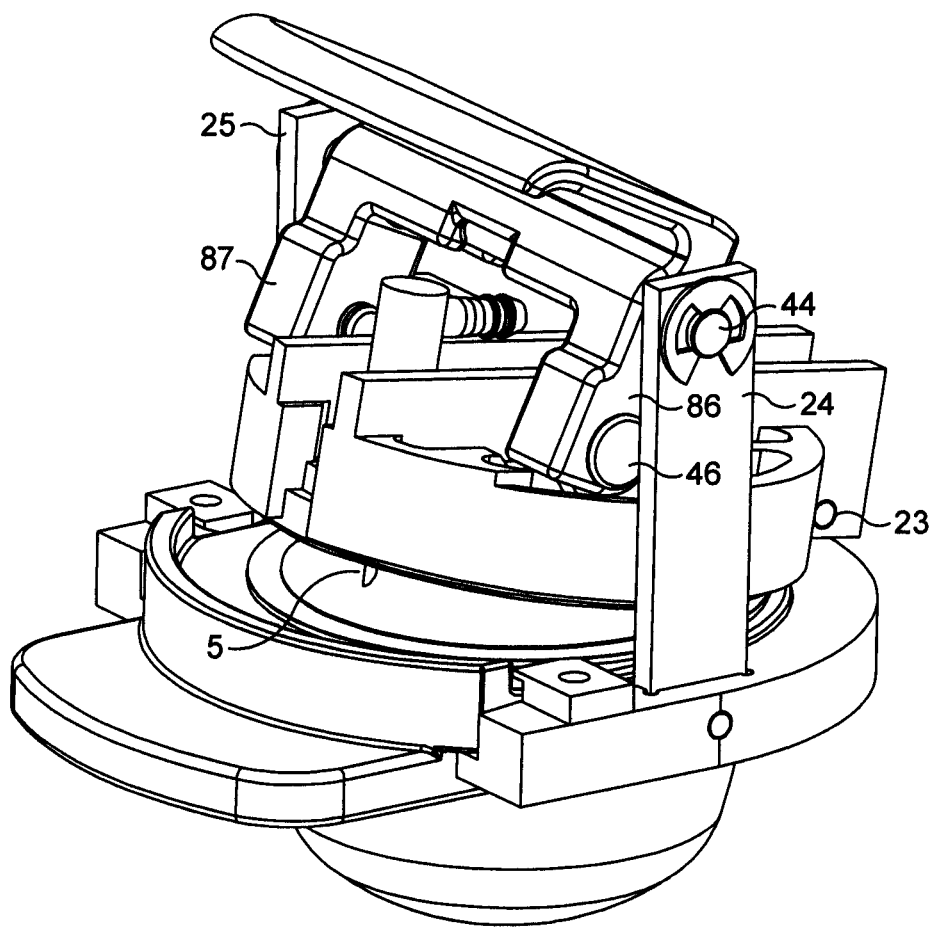
FIG. 3 shows a perspective view like in FIG. 2, with the cartridge holder in the insertion position and the supply unit in the open position.
Figure 4:
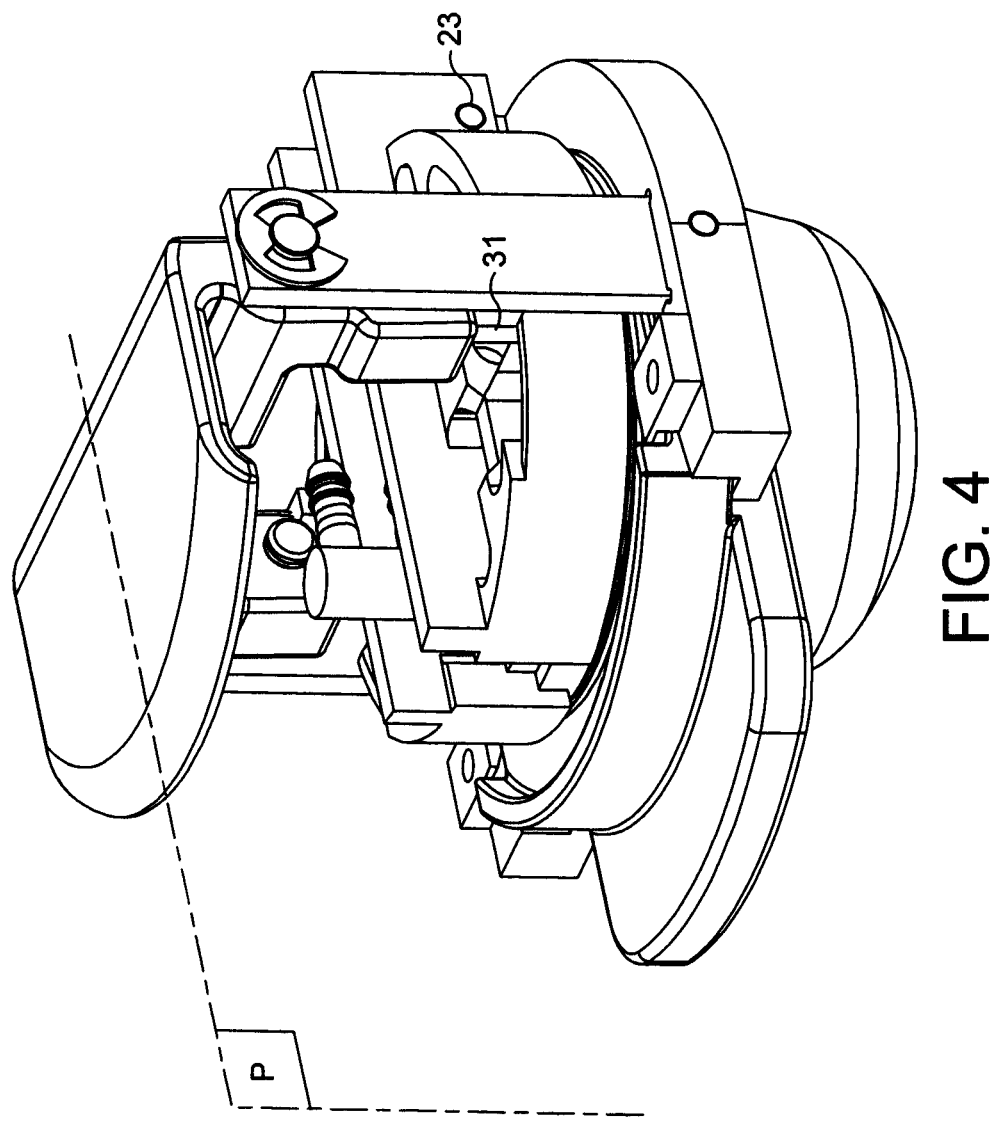
FIG. 4 shows a perspective view like FIGS. 2 and 3, in the closed position of the supply unit, that is to say in the injection position.

FIG. 1 shows, in simplified form, a system for dispensing liquids prepared from cartridges comprising a device or machine 1 and a cartridge 3 adapted to said device. The liquid may be a hot or cold drink such as coffee, cappuccino or tea or any other food preparation such as sauces, soups or the like.

Each cartridge contains one or more food ingredients in solid, liquid, gel or paste form. It may be, for example, roasted ground coffee powder, instant coffee, milk powder or liquid concentrate, cocoa, or tea in leaf or instant form.

The cartridge is advantageously of the type of that described in Patent EP 1 472 156 B1. In particular, the cartridge 3 may comprise an injection wall 10 in the form of a flexible membrane through which the fluid (that is to say an amount of hot or cold water) is injected from the supply unit and a duct 44 intended to guide the prepared liquid directly into the cup. The membrane may be attached to a sealing edge of the body of the cartridge. The cartridge may comprise an airtight inner chamber containing the ingredients. The chamber may be punctuated under the effect of the rise in pressure of the fluid injected into the chamber in order to allow the prepared liquid out. The puncturing for delivering the liquid may be carried out by puncturing means specific to the cartridge in combination with at least one inner membrane of the chamber. The puncturing may be carried out by deforming the inner membrane against the puncturing means until the rupture tension of the membrane material is reached. The cartridge could also be opened by bursting an outlet membrane during the rise in pressure of the liquid in the cartridge, that is to say without any internal puncturing element. One advantage of the cartridge is that extraction, dissolving or percolation can be performed under a controlled pressure, of the order of 4 to 20 bar, inside the cartridge by slowing down the flow of the ingredients and by improving the interaction of the ingredients with the pressurized fluid. This principle makes it possible to create more froth than with low-pressure percolation methods. Another advantage is that it is possible, at the same time, to limit the contact between the liquid and the device such as is described in Patent EP 1 472 156 B1. Of course, the invention is not limited to the use of the cartridge according to that patent. For example, the membrane and the opening means may be replaced by a filtering element, for example, such as a paper and/or plastic filter and a filter support comprising liquid collection channels and/or dispensing openings.

It is understood that the device according to the invention could be used in relation with any type of cartridges including cartridges in the form of pods for a low-pressure system for preparing a drink.

In the present description, the term "injection fluid" mainly relates to hot or cold water or else to a mixture of water and air.

The device may comprise a support structure 40 in which a pressurized fluid supply unit 2 is mounted and comprises a cartridge holder 6 that can be detached from the device. Arranged under the cartridge holder is a serving area 41 which, for example, comprises a cup support 42. The device comprises, in addition, a reserve of water such as a removable reservoir, associated with a pump, a water heater and a fluid circuit to supply the fluid supply unit 2 with hot and/or cold water as required. The device also comprises a reasonably sophisticated control means allowing the user to select, from a pre-established range of choices, several options for hot and/or cold preparations and/or several sizes of drink to be dispensed. The control means may be associated with a controller which selectively controls the switching-on of the pump, of the water heater and of (a) valve(s) associated with the fluid circuit. The control means may be a means of the type having a lever, valve or else one or more control buttons.

FIGS. 2 to 7 show a first embodiment of the device according to the invention. The cartridge holder and the pressurized fluid supply unit 2 comprise complementary insertion means 7 configured to allow the cartridge holder 6 to be inserted into the unit in a preferred direction A. The means 7 are such that the cartridge holder can be detached from the device. The term "detachable" means that the cartridge holder is not connected to the device, in particular to the supply unit 7, by any permanent connection means when in the "detached" position and can be carried around freely so that its cartridge can be emptied out once this cartridge has been used so that it can be reloaded with a fresh cartridge 10. The cartridge holder can thus be rinsed or cleaned easily in order to remove any food remains from its surface.

However, the invention may also relate to a cartridge holder that cannot be detached from the device or from the supply unit but which can be inserted into the supply unit from a drawer open position. A "drawer open" configuration means that the travel of the cartridge holder is halted by stop means that allow a cartridge to be loaded without having to completely remove the cartridge holder. It is understood that the cartridge holder may thus be arranged in such a way so as to adopt a drawer open position and be detachable if required, for example for cleaning.

The complementary insertion means 7 for inserting the cartridge holder into the supply unit may adopt various forms. The complementary means are preferably arranged in such a way as to allow direct and substantially linear insertion of the cartridge holder into the supply unit simply by the user pushing on the cartridge holder in the direction of insertion A. The cartridge holder is positioned in a reference position in the supply unit prior to movement and with engagement of the injection means with the cartridge.

According to one possible practical embodiment, the insertion means comprise guide ribs 18 and guide grooves 19 formed to complement one another on, respectively, the sides of the cartridge holder 6 and on the inner sides of the base part 20 of the supply unit. According to the principle of the invention, said insertion means 7 extend laterally and preferably in a direction that is slightly inclined with respect to the horizontal plane H. Therefore, the cartridge holder is inserted into the supply unit in a configuration that is inclined slightly downwards.

On the same side as the fluid supply unit 2, the base part 20 is fixed to the device in a non-movable manner. Mounted on this base part 20 is an injection support 4 in the form of a disc which is able to move relative to the base part. The injection support known as the "movable support" in the remainder of the description according to this embodiment can be moved under the effect of actuating means 22 that form part of the clamping means along the base part and in a movement combining a rotation and an axial displacement; this allowing an easier application of the support against the cartridge holder and the cartridge and compensation for the tolerances and functional play.

Figure 5:
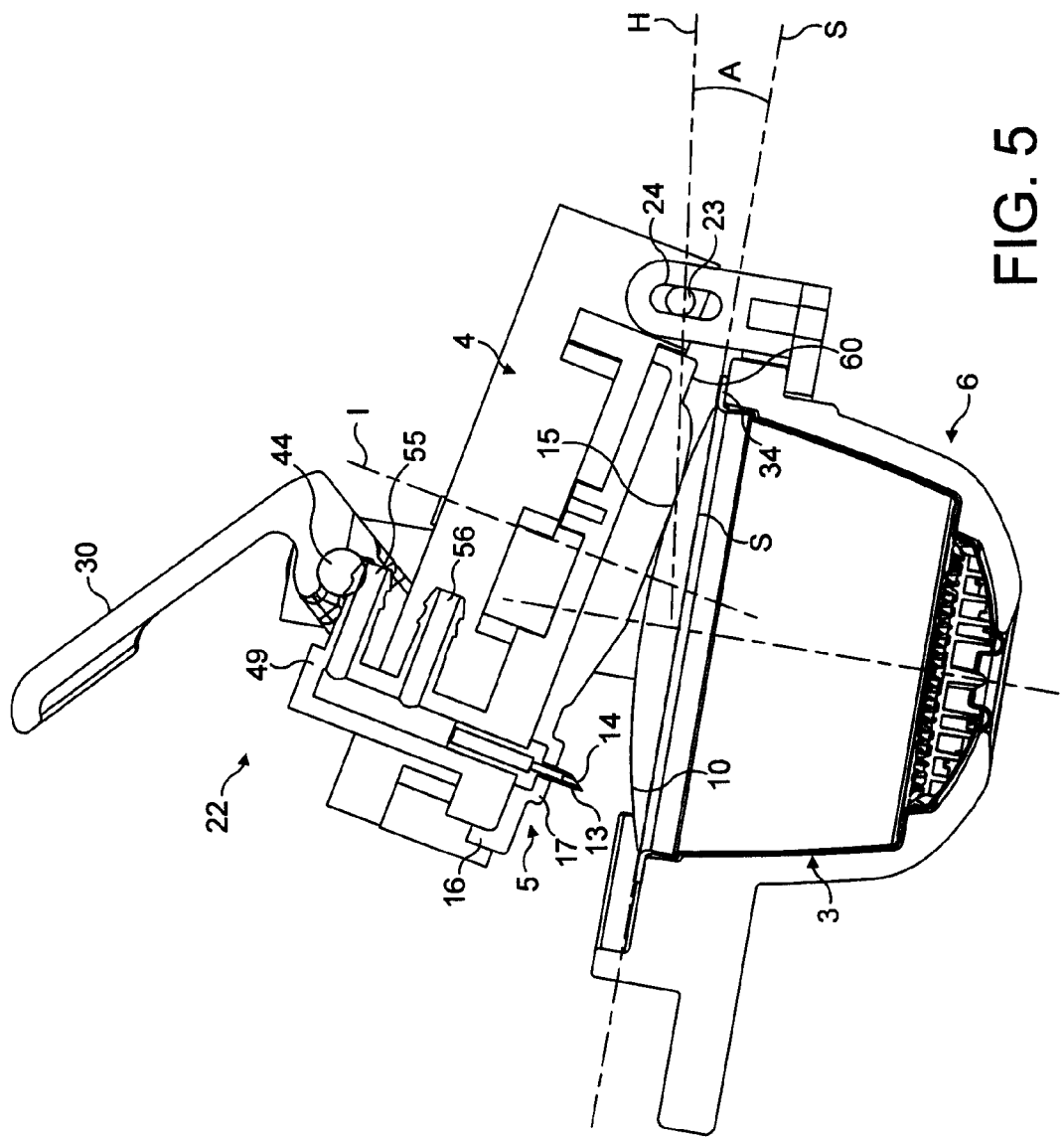
FIG. 5 shows a transverse cross-sectional view along the plane P from FIG. 4 in the open position.
Figure 6:
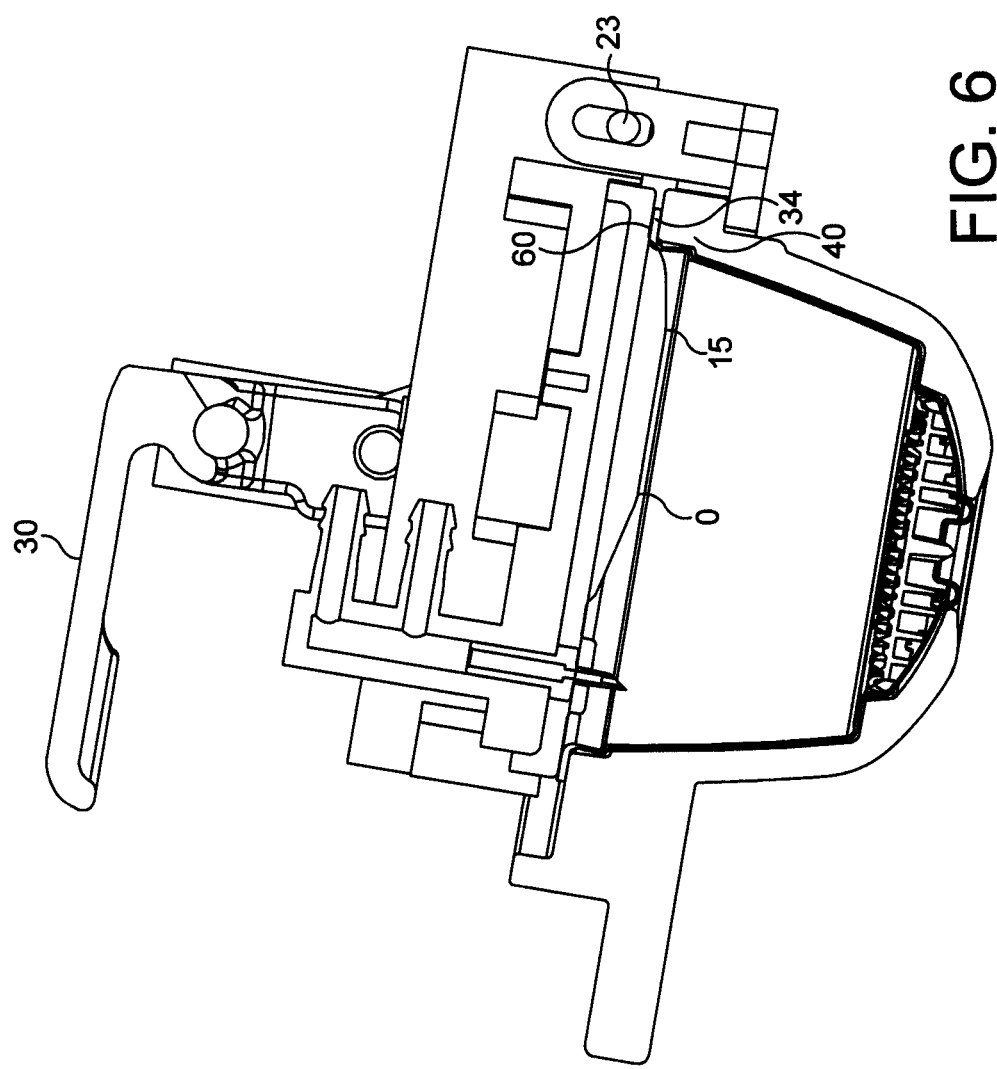
FIG. 6 shows another transverse cross-sectional view along P in the injection position.

The movable support 4 comprises injection means 5 which are preferably positioned offset from the central axis I of the movable support (FIG. 5). The central axis I of the movable support is then aligned with the centre O of the injection surface of the cartridge after engagement of the injection means by lowering the support 4 (FIG. 6).

The movable support 4 is mounted on the base part 20 about a pivot pin 23 situated on the front side of the support and guided axially in such a way as to allow the movable support to be moved in a combined axial and rotational movement against the cartridge holder. As shown in FIG. 5, the movable support comprises a pin parallel to the transverse plane of the support 4, mounted in one or more axial guide housings or slots 24 of the base part allowing the support to be moved in a rotational direction and in an axial translational direction at the same time. The advantages are mainly linked to a setup that is able to compensate for the functional play while avoiding wear by comparison with a purely linear and axial movement while disengaging the edges 34 of the cartridge relative to the movable support during reopening.

Actuation of the movable support from its open position, that is to say its position away from the cartridge holder, to its injection position is performed by an actuating system 22. Various actuating systems may be envisaged. According to the embodiment represented, the actuating means is a toggle lever 29 associated with a manual lever 30. In one automated embodiment, the lever could be replaced by a motor. Preferably, the actuating systems are situated vertically above the movable support and are attached to the base part. More specifically, the lever 30 comprises two laterally spaced arms 86, 87 articulated, on the one hand, to the end of the two branches 24, 25 of the fixed base part by two fixed pins 44 spaced laterally apart and, on the other hand, to a pair of arms 31 of the toggle lever by two other movable pins 46.

It should be noted that the actuating system 22 is preferably associated with a spring-back means (not represented). The spring-back means may be associated with the lever and/or with the toggle lever so as to automatically reposition the injection support in the raised position or away from the cartridge holder when no reaction forces are being exerted on the actuating means by the trapped edges of the cartridge allowing the support to be locked by the actuating and locking means. The locking means may also be positioned between the fixed base part and the movable support 4. As an example of spring-back means, a spring is provided in order to return the lever automatically to the raised position according to FIG. 3 in the absence either of the cartridge holder or of the cartridge in the cartridge holder when the latter is inserted without a cartridge in the position of FIG. 3.

FIG. 5 shows the detail of the fluid supply unit and of the arrangement of the cartridge holder in the supply unit with the movable injection support 4 in the raised position.

According to one preferred embodiment of the invention, the injection means 5 intrude into the cartridge. In other words, the injection means pass through the injection surface of the cartridge and extend at least partially inside the cartridge. They may comprise, for example, an injection spike 13 secured to the movable support 4 which punctures or cuts the upper face of the cartridge. At the outset, the injection surface 10 of the cartridge may be slightly convex. The spike has, passing through it, a duct 14 for conveying injection fluid (hot or cold water) into the cartridge. The injection spike extends through the support and on the opposite side of the cartridge extends via one or more connectors 49. A branch of a connector may be provided with two separate inlets 55, 56 allowing a supply of hot fluid and a supply of fluid at ambient or cold temperature. The inlets are connected to flexible supply tubes which are themselves connected to the rest of the fluid system (not shown). The selection of hot or cold fluid to supply the injection means may be performed by one or more valves (not shown). As shown in FIG. 5, the injection spike is terminated by an outlet orifice of small cross section, preferably smaller than 0.5 mm, enabling a jet of fluid to be directed at high velocity into the cartridge. Preferably, the orifice is directed axially relative to the duct 14 and in the direction of the bottom of the cartridge, once inserted in the latter (FIG. 6). The offset position, the direction and the high velocity of the jet contribute to generating a turbulent flow of fluid inside the cartridge and therefore aims at improving the dissolving or dispersion of certain ingredients, even with cold water as the injected fluid.

According to one possibility of the invention, the injection means comprises a sealing means 16 in the form of a coating made of an elastic material that extends over the entire surface of the injection support 4.

The injection means may comprise a raised annular portion 17 locally surrounding the base of the injection spike. This makes it possible to improve the sealing locally around the spike by increasing the local pressure in the injection surface of the cartridge at this location during the engagement of the injection means.

The sealing means may be a coating made of an elastomeric material, made of silicone or made of a plastic of low hardness and that is elastically flexible.

It should be understood that the injection face of the cartridge may also be flexible. The surface may be, at the outset, slightly convex due to the presence of gas contained in the cartridge, then is deformed, in this case, partly under the effect of the axial mechanical pressure exerted by the sealing means 16. Sealing by compensating for play is achieved by the combination of the sealing means 16 and the deformation of the injection face of the cartridge. The deformation of the injection face occurs when the cartridge is pressurized by the injection fluid. Internal thrust forces are then created inside the cartridge and are directed towards the sealing means in order to press the surface 10 of the cartridge against said means. Therefore, the entire injection surface of the cartridge is pressed in a leaktight manner against the surface of the sealing coating. This thus has the advantage that even a damaged cartridge, that is to say one with an injection surface that has been accidentally pierced, could function in the device.

The coating 16 could be replaced by a discrete element such as a ring made of an elastic material localized only around the spike.

By virtue of the sealing afforded by the elastic surface of the support, the pressurized fluid injected through the injection spike is held directly at the base of the orifice made by the spike, or in close proximity thereto, and cannot therefore re-emerge between the surface 10 of the cartridge and that of the movable support 4. This also reduces the surface areas of the device in contact with the liquid thereby preventing the possibility of any liquid rising back up. The system is also thus rendered leaktight with respect to the cartridge holder and is so independently of the actual clamping of the cartridge holder in the device.

According to one feature already mentioned, the movable injection support 4 and the injection means can be locked in the injection position by clamping means, in particular the actuating system 22 on a clamping portion 60 when the cartridge holder contains a cartridge and the cartridge holder is inserted into the fluid supply unit. The movable support 4 comprises a clamping surface portion 60 which bears on an edging 34 of the cartridge. The edging 34 itself rests against bearing or clamping edges 40 of the cartridge holder. The edging is therefore trapped between the portion 60 and the edges 40 of the cartridge holder. The actuating means, particularly the toggle lever actuated by the lever, therefore exert compressive clamping forces which are transmitted by the movable support 4 to the edging of the cartridge. The locking of the toggle lever obtained by moving it through its "stiff" point only occurs if a cartridge is therefore present in the cartridge holder thus creating an overthickness needed to force the toggle lever through its "stiff" point and thus obtain a stable support clamping position. This clamping is important for making it possible to ensure safety in the immobilization of the cartridge holder in the mode of operation in which pressurized fluid is introduced into the cartridge. The clamping also contributes to firmly holding the edging 34 for sealing the cartridge without risk of its membrane 10 delaminating from the edging of the body of the cartridge.

In the case of absence of the cartridge or of the cartridge holder, lowering of the movable support 4 by means of the lever acting on the toggle lever does not give rise to a bearing effect and therefore does not generate enough reaction forces on the toggle lever. Due to the presence of a spring-back means in association with the lever and/or the toggle lever, the lever pivots in the direction of reopening; which makes the toggle lever rise back up from the moment when the user is no longer pressing down on the lever. It is therefore impossible to keep the movable support in a stable lowered position when the cartridge holder has been removed or the cartridge is not engaged in the cartridge holder. The latter is therefore returned to the open position; thus allowing the cartridge holder to be taken out or the cartridge holder to be inserted with its cartridge in the device.

It is understood that the clamping forces applied to the cartridge holder in the supply unit are not borne mainly by the sealing means. This is an advantage since the sealing function is partly separated from the function of clamping the cartridge holder in the unit; the latter function is intended to prevent any possibility of the cartridge holder disengaging while the device is under pressure. This also makes it possible to achieve sealing on a flexible part of the cartridge and as close as possible to the injection point without the risk of rupturing the injection surface of the cartridge especially when this surface is a flexible membrane. It then follows that the sealing means is also less stressed in terms of compression and therefore retains its resilience and therefore sealing properties for longer.

Of course, the actuating and locking means of the movable support could be a structure other than a toggle lever. It could be, for example, a cam or a series of gears.

The thickness of the movable support may be adjusted by adjusting means. The adjustment may be necessary to ensure that the actuating means work correctly bearing in mind the phenomena of wear, tolerance, possible expansion due to heat, on the various components that make up the system, namely the cartridge and the device itself. The adjustment makes it possible, for example, to adjust the switching force needed to switch the toggle lever through its "stiff" point. The adjusting means allow the force with which the actuating means close to be adjusted and therefore influence the force exerted by the injection means on the surface of the cartridge in order to ensure good sealing under high-pressure conditions in the cartridge.

One problem of the invention consists in reducing the risk of creating a jet of liquid outside of and on the same side as the injection face of the cartridge after the injection means have been removed, more specifically from the intrusive portion of the injection spike, outside of the cartridge. This phenomenon generally occurs, on the one hand, due to the fact that the cartridge contains a volume of compressed gas during pressurization of the fluid in the cartridge; a volume which then expands rapidly during disengagement of the injection means.

Figure 7:
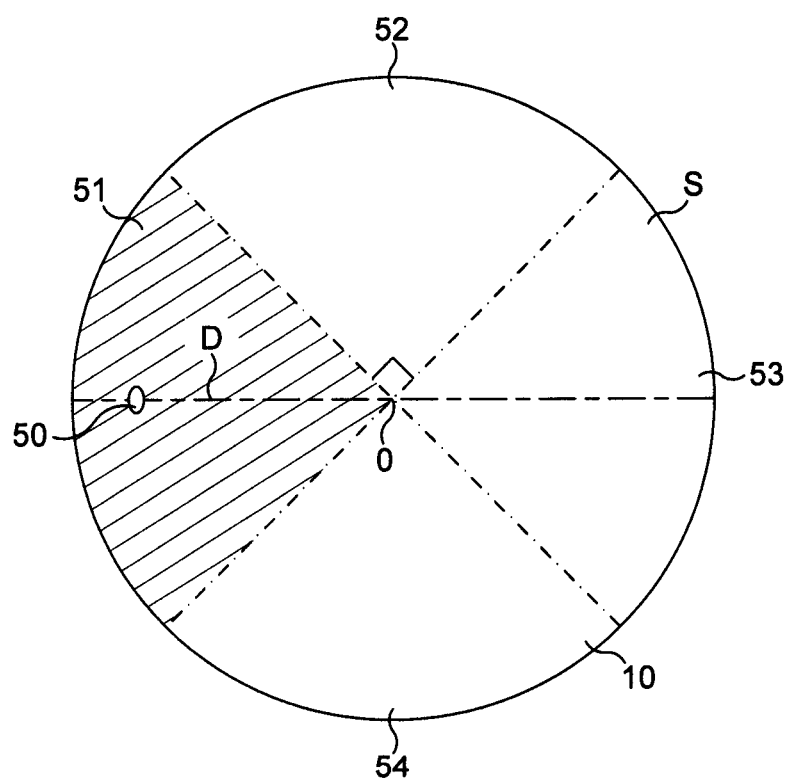
FIG. 7 shows a schematic view of the injection surface of the cartridge.

In order to overcome this drawback, the device according to the invention proposes a solution which consists, on the one hand, in keeping the cartridge holder 6 in a configuration that is inclined by a few degrees with respect to the horizontal plane H so as to substantially incline the injection surface 10 of the cartridge with respect to the same horizontal plane and, on the other hand, to place the injection means 5 on the substantially highest side of the surface 10 of the cartridge or of the cartridge holder, so as to keep a gas bubble at the location of the injection point. FIG. 7 shows the representation of the injection surface 10 and the injection point 50. In order to determine the inclination of the injection surface according to the invention and taking into account the possible convexity or concavity of said surface, the plane projected surface S, starting from the edges 34 of the cartridge, is taken as convention as the reference surface of the injection surface. This surface S considered as the "injection surface" by definition makes an angle A relative to the horizontal plane H as is shown in FIG. 5. The surface is made up of four imaginary quadrants 51, 52, 53, 54, once the cartridge is positioned in the cartridge holder and the latter is correctly inserted in the base part. Preferably, the injection point is positioned inside the quadrant 51 that is located highest up relative to the horizontal plane. More preferably still, the injection means are arranged so that the injection point is situated in the alignment of the side of the right-hand segment D (passing through the centre) that is the most inclined relative to the horizontal plane. Preferably, the inclination angle of the surface S is between 2 and 25 degrees, more preferably still, around 5 to 20 degrees.

One additional solution also consists in decreasing the internal volume of the cartridge before the injection and in re-establishing the volume of the chamber at the moment of removal of the injection means from the cartridge. This variation in cartridge volume makes it possible to create enough absorption volume to at least partially compensate for the raised pressured inside the cartridge. The gas expansion then no longer occurs suddenly by propelling a jet of liquid outside of the cartridge but the gas tends to expand, at least partly, in a deformable volume of the cartridge after the removal of the injection means.

In order to do that, a raised engagement portion 15 of the movable support is provided which is configured to drive the wall 10 of the cartridge towards the inside of the cartridge and to thus decrease the internal volume of the cartridge. The engagement surface forms part of the lower wall 16 of the movable support. Since the injection surface of the cartridge is sufficiently flexible, for example is a membrane a few tenths of a millimeter thick, this surface deforms upon contact with the raised engagement portion 15 of the movable support when this is brought into the injection position. As shown in FIG. 6, during the closure of the injection unit against the cartridge holder, the raised engagement portion 15 pushes the cartridge membrane inwards to make it concave. The engagement portion 15 may be made from an elastic material acting as a sealing element on the surface of the cartridge as already discussed.

When the movable support 4 is disengaged from the cartridge holder, the engagement portion 15 no longer exerts pressure against the cartridge and the injection surface tends to at least partially return to its original position by the effect of gas expansion inside the cartridge.

Figure 8:
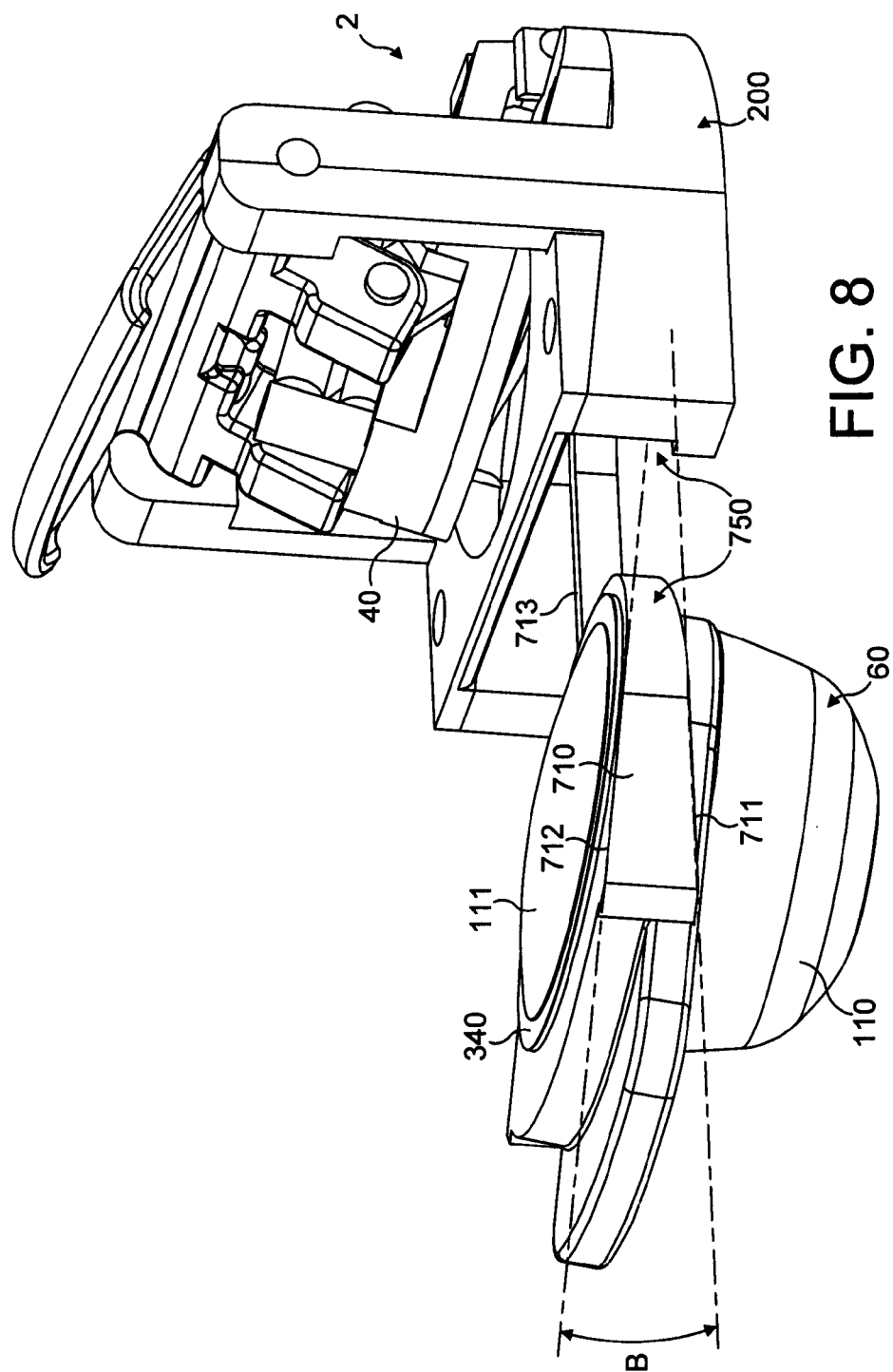
FIG. 8 shows a perspective view of the device according to a second embodiment, in particular of the supply unit in the open position and of the cartridge holder in the detached position.
Figure 9:
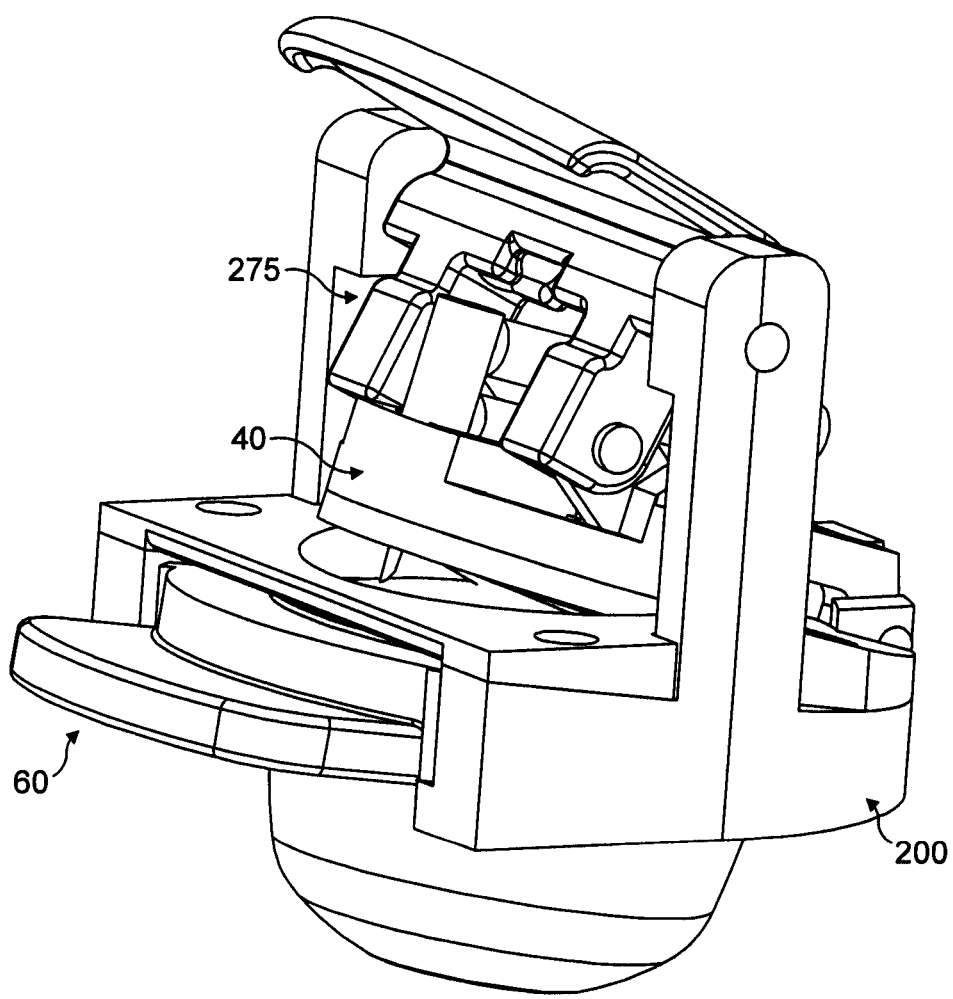
FIG. 9 shows a perspective view like in FIG. 8, with the cartridge holder in the insertion position before engagement of the injection means against the cartridge holder.
Figure 10:
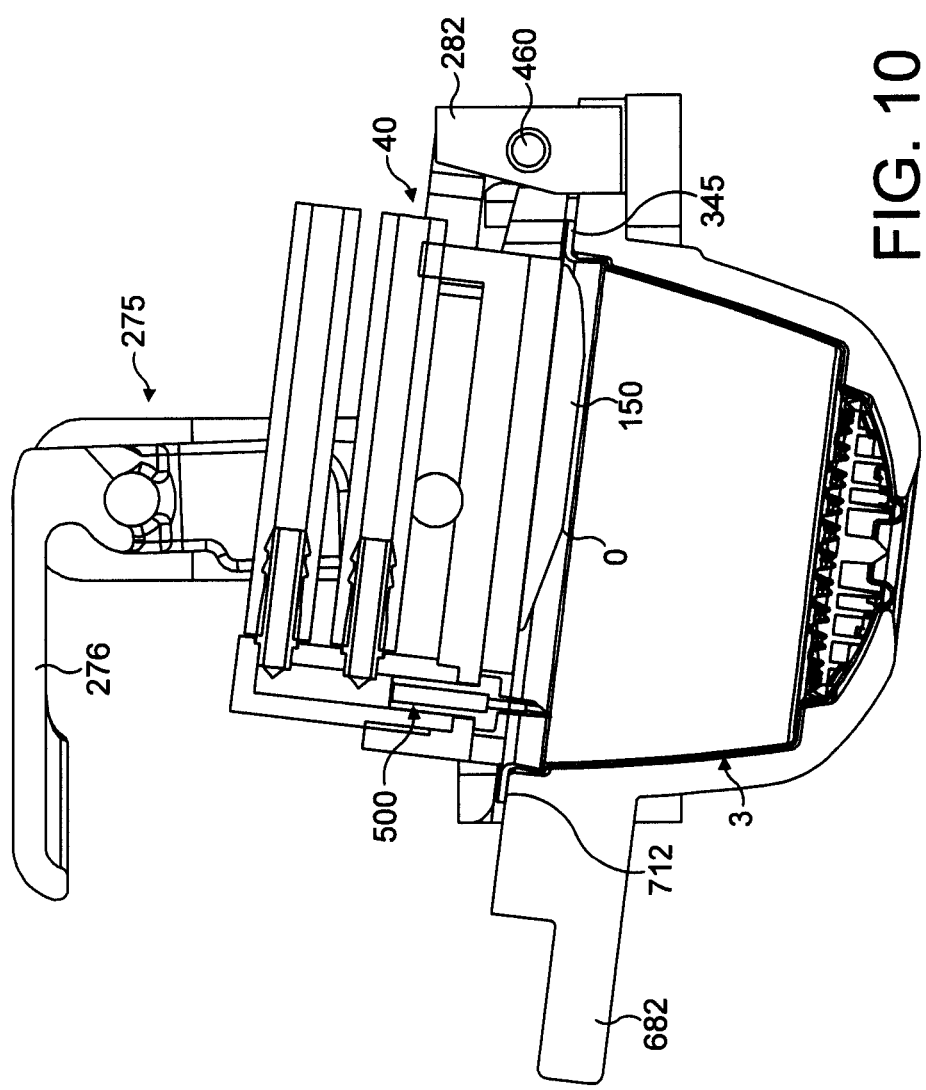
FIG. 10 shows a cross-sectional view along the longitudinal median axis from FIG. 8 in the closed position of the supply unit.

A second possible embodiment is illustrated in FIGS. 8 to 10. In this case, the cartridge holder 60 and the base part 200 of the supply unit are equipped with wedge-shaped complementary insertion means 750. The cartridge holder is arranged to be inserted along the edges of the supply unit by simple sliding. The cartridge holder has a handle 682 for ease of handling when inserting and removing it. The principle of these means is to allow insertion by sliding then sufficient wedging of the cartridge holder in the base part in its insertion position under the combined effect of the geometry of the complementary insertion means and the fluid pressure exerted in the cartridge. As soon as the system is pressurized, friction forces between the cartridge and the supply unit increase so that clamping is carried out between the inner surface of the supply unit and the cartridge holder.

As in the preceding embodiment, the device comprises a cartridge holder 60 detachable from the fluid supply unit 2 which is secured to the remainder of the device as in FIG. 1. The cartridge holder has a free support portion 110 which is wide open towards the top and forms a shell to accept a cartridge 3. The cartridge thus rests in the cavity formed by the free portion or shell and its edges 340 rest against the upper edges 712 of the cartridge holder.

The cartridge holder 60 comprises two lateral edges forming ribs 710 of variable thickness. More specifically, the edges or ridges have a thickness that decreases in the direction of the free insertion end of the cartridge holder. The lower ridge 711 of the ribs forms a slope and converges in the direction of the upper ridge 712 in the direction of insertion of the cartridge holder into the unit. The ribs therefore have a thickness defined by the ridges 711, 712 which gradually decreases in the direction of the free end of the cartridge holder. On each side of the cartridge holder, the lower ridge 711 is intended to rest against a lower ridge 713 of each groove formed in the base part. Preferably, the ridges 713 of the base part may be substantially horizontal or slightly inclined. The lower ridge 711 of the cartridge holder thus forms an angle of inclination B with respect to the upper bearing edge 712 of the cartridge holder on which the edging 340 of the cartridge rests. This angle B is preferably between 2 and 20 degrees, for example around 4-6 degrees. In this way, the cartridge holder is inserted into the base part 200 in a substantially horizontal or slightly inclined configuration by guidance of the ribs along the lower ridges 711, 713 while keeping the edges 712 inclined. Due to the angle of the ribs, the injection surface 111 of the cartridge is kept inclined during the operation of insertion and of holding in the injection position.

It is therefore clearly understood that the wedge-shaped insertion means may have several functions. A first function using the "Morse taper" principle is a play compensation and/or "self-locking" clamping function using the injection pressure. A second function is linked to the raising of the injection point of the cartridge in order to avoid resurgence of liquid. Another function is also to facilitate the engagement of the cartridge holder in the insertion means of the supply unit, especially by keeping the injection spike as far away as possible from the surface of the cartridge, especially at the beginning of the insertion of the cartridge holder, so as to thus avoid tearing or lacerating the injection surface of the cartridge, especially when the latter has a slightly convex shape.

The supply unit has, itself, a support 40 on which the injection means 500, which can be moved in a rotational direction, are arranged. More specifically, the movable support 40 in the form of a disc is mounted on an extension 282 of the base part about an axis of rotation 460 located on the side, for example at the back, of the disc. The movable support is actuated by toggle-lever type actuating means 275 and a lever 276 as in the embodiment from FIGS. 1 to 6. The injection means are identical to those of the embodiments from FIGS. 1 to 6. During the closure, the movable support 40 passes through an opening made in the fixed base part of the supply unit in order to press against the surface of the cartridge. The movable support comprises a convex-shaped engagement portion 150 which makes it possible to reduce the volume of the cartridge during the closure for the same reasons as those described previously.

The clamping of the edges of the cartridge 345 against the inner surface of the fixed base part of the supply unit is mainly carried out by a "Morse taper" effect which is exerted by the combination of the wedge-shaped geometry and the pressure rise in the cartridge.

Of course, the invention is not restricted to the embodiments thus described either, but extends to other possible embodiments that fall within the scope of the attached claims.

What is claimed is:
1. A capsule-carrier comprising:
a housing having a free end and a cavity configured and dimensioned for removably receiving and carrying a capsule, the capsule containing at least one alimentary substance and comprising a roof membrane through which fluid is injected in order to form a liquid with the alimentary substance;
means for linear insertion of the free end of the housing into a feeding unit, the feeding unit designed for injecting fluid at an injection point through the membrane roof of the carried cartridge,
wherein the linear insertion means comprises at least one guide-rib and/or guide-groove portion, wherein the said guide-rib and/or guide-groove portion has a variable thickness to form ridges variably spaced-apart thus forming a self-locking wedge-shaped, linear insertion means that acts to lift a carried capsule to avoid resurgence of fluid.

2. The capsule-carrier according to claim 1, wherein the thickness of the said guide-rib portion or guide-groove portion comprises a pair of lower ridges which converge in the direction of a pair of upper ridges and towards the free end of the capsule-carrier.

3. The capsule-carrier according to claim 2, wherein the upper and lower ridges form an angle of about 5 to 20 degrees.

4. The capsule-carrier according to claim 1, wherein the means of insertion orients the housing of the capsule-carrier to present the capsule at an angle with respect to a horizontal plane.

5. The capsule-carrier according to claim 4, wherein the means of insertion comprises two guide-ribs or guide-groove portions positioned on opposite sides of the housing of the capsule carrier.

6. The capsule-carrier according to claim 4 wherein the feeding unit further comprises injection means that move relative to the capsule carrier in order to inject fluid into the capsule through the roof membrane; wherein the capsule carrier is positioned in an injection position so that the roof membrane of capsule is held substantially in a plane inclined at an angle of less than 45 degrees relative to the horizontal plane.

7. The capsule-carrier according to claim 6, wherein the injection means is configured to be offset from the highest side of the capsule after engagement of the injection means against the roof membrane of the capsule.

8. The capsule-carrier according to claim 6, wherein the injection means is configured to form an injection point at the roof membrane of the cartridge surface inside the highest quadrant relative to its center and the roof membrane of the cartridge is inclined at an angle between 2 and 25 degrees relative to the horizontal plane.

9. The capsule-carrier according to claim 8, wherein the roof membrane of the capsule is inclined at an angle between 5 and 20 degrees relative to the horizontal plane.

10. The capsule-carrier according to claim 4, wherein the means of insertion of the supply unit are directed along an inclined plane relative to the horizontal plane so that the capsule carrier is guided in the direction of the inclined plane during its insertion and removal from the feeding unit.

11. The capsule-carrier according to claim 4, wherein the injection means comprises a single injection spike supported by an injection support that is able to move into engagement relative to the roof membrane.

12. The capsule-carrier according to claim 11, wherein the injection spike forms an opening of at least 1 mm in diameter in the roof membrane of the capsule.

13. The capsule-carrier according to claim 11, wherein the injection support comprises a raised engagement portion in order to drive the roof membrane of the capsule towards the inside of the capsule and to thus reduce the internal volume of the capsule.

14. The capsule-carrier according to claim 13, wherein the engagement portion of the roof membrane is convex and spaced apart from the injection spike.

15. The capsule-carrier according to claim 8, which further comprises sealing means provided in association with the injection means in order to provide sealing directly between the injection means and the roof membrane of the cartridge, wherein the sealing means is a sealing ring surrounding the base of the injection spike.

16. The capsule-carrier according to claim 15, wherein the sealing means extends over the movable support in order to fit against substantially the whole of the roof membrane of the cartridge, and comprises a ring or coating made of an elastomer or silicone material.

17. The capsule-carrier according to claim 11, further comprising a capsule that includes a body comprising an edging to which the roof membrane is sealed, and the roof membrane of the capsule is convex before engagement of the injection support and is deformed in order to become substantially concave after engagement of the injection support.

18. The capsule carrier of claim 4, wherein the feeding unit comprises a fixed base part and an injection support that is able to move relative to the base part and that can be actuated in engagement relative to the capsule carrier on which injection means are arranged for injecting an injection fluid into the capsule after engagement of the support relative to the capsule carrier, with the capsule carrier positioned in the feeding unit in an injection position in a plane inclined at less than 45 degrees relative to a horizontal plane, and the movable support can be moved into engagement relative to the capsule carrier in order to place the injection means offset relative to the central axis of the movable support and from the substantially highest side in the housing of the capsule carrier while the capsule carrier is kept in an inclined position in the feeding unit.

19. The capsule carrier of claim 18, wherein the injection means is configured to form an injection point through the roof membrane inside the highest quadrant relative to its center and the roof membrane of the capsule is inclined at an angle between 2 and 25 degrees relative to the horizontal plane.

20. A capsule-carrier system for preparing an alimentary substance comprising:

a housing for receiving a capsule, having a free end and a cavity configured and dimensioned for removably receiving and carrying the capsule; and means of insertion in a feeding unit configured for feeding in fluid for preparing a liquid food from a capsule containing at least one alimentary substance, the insertion means comprising at least one guide-rib and/or guide groove portion, wherein the said guide-rib and/or guide-groove portion has a variable thickness, thus forming a wedge-shaped, linear insertion means, and wherein the thickness of the said guide-rib portion or guide-groove portion comprises a pair of lower ridges which converge in the direction of a pair of upper ridges and towards the free end of the capsule-carrier, with the upper and lower ridges forming an angle of about 5 to 20 degrees, and wherein the capsule carrier is designed to be operatively associated with and received by the feeding unit such that the capsule carrier presents the capsule at an angle with respect to a horizontal plane in the housing inclined at an angle of less than 45 degrees with respect to the horizontal plane.

21. A capsule-carrier comprising:

a housing having a free end and a cavity configured and dimensioned for removably receiving and carrying a capsule containing at least one alimentary substance, with the capsule comprising a roof membrane through which fluid is injected in order to form a liquid with the alimentary substance;

means for linear insertion of the free end of the housing into a feeding unit, the feeding unit designed for injecting fluid at an injection point through the membrane roof of the carried cartridge, wherein the linear insertion means comprises at least one guide-rib and/or guide-groove portion, wherein the said guide-rib and/or guide-groove portion has a variable thickness to form ridges variably spaced-apart thus forming a self-locking wedge-shaped, linear insertion means that acts to lift a carried capsule to avoid resurgence of fluid, wherein, when placed in the cavity, the roof membrane of the capsule is inclined at an angle between 2 and 25 degrees relative to the horizontal plane.

* * * * *